Dec. 26, 1961
L. PÉRAS
3,014,568
CLUTCH CONTROL MEANS FOR AUTOMATICALLY CONNECTING
AND DISCONNECTING THE DRIVE OF COOLING
FANS OF VEHICLE ENGINES
Filed Dec. 9, 1958
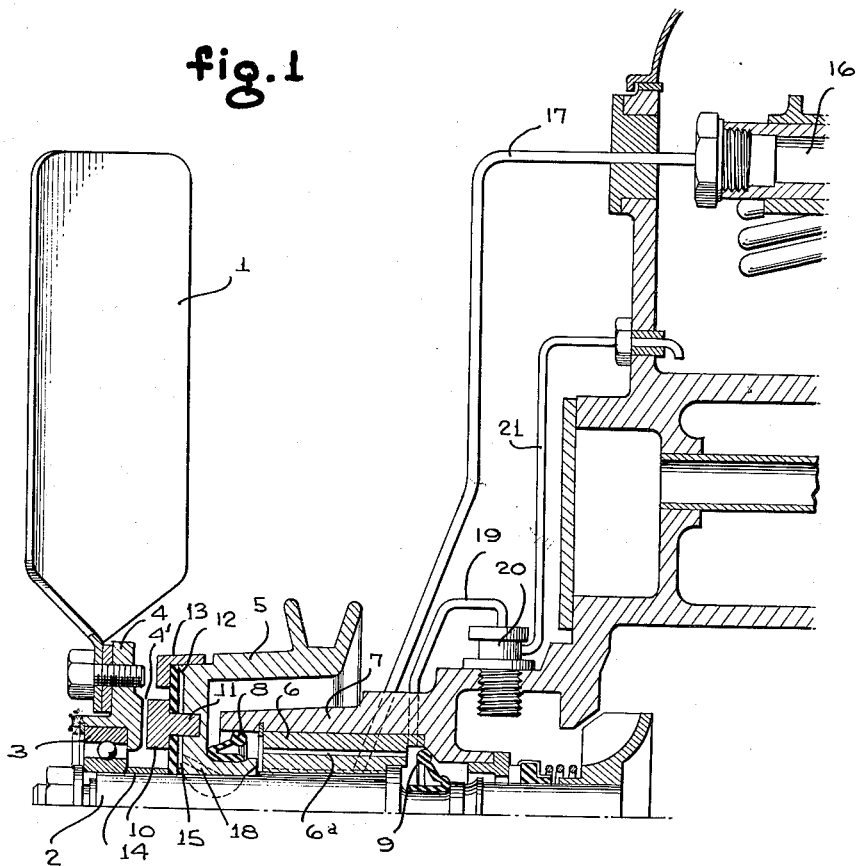
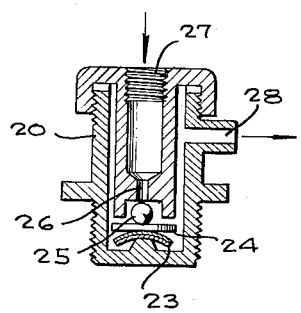
INVENTOR.
LUCIEN PÉRAS
BY
Stevens Davis Miller & Mosher
ATTORNEYS

3,014,568
CLUTCH CONTROL MEANS FOR AUTOMATICALLY CONNECTING AND DISCONNECTING THE DRIVE OF COOLING FANS OF VEHICLE ENGINES

Lucien Péras, Billancourt, France, assignor to Regie Nationale des Usines Renault, Billancourt, department of Seine, France
Filed Dec. 9, 1958, Ser. No. 779,199
Claims priority, application France Dec. 24, 1957
3 Claims. (Cl. 192—88)

This invention relates to the drive of fans for cooling radiators on automotive vehicles and has specific reference to a hydraulic control device for automatically connecting and disconnecting the fan relative to its driving shaft or member.

The provision in an automotive vehicle of a device for controlling the driving connection between the cooling fan and its driving member as a function of the engine temperature or of other physical factors depending thereon such as the water in the cooling system or the air flowing from the radiator is attended by a number of known advantages such as a faster warming up of the engine, the reduction in power consumption, noise, etc., leading finally to a better and more economical operation of the engine from the dual points of view of wear and fuel consumption.

It is one object of this invention to provide a hydraulic clutch device operated by means of the oil under pressure of the lubrication system of the engine for automatically controlling the fan drive according to the temperature of operation of the engine.

To this end, the fan being mounted on its driving shaft through the medium of a ball-bearing or a plain bearing, the device comprises a friction disc rotatably solid with the driving shaft but adapted to move axially under the influence of the oil pressure on the one hand and of an antagonistic return spring on the other hand. The arrangement is such that the action exerted by the oil pressure exceeds the force of the antagonistic return spring, and that the friction disc may assume two different positions on the shaft, according as the oil pressure is applied or not thereto. In the first position the clutch engagement is obtained by simply causing the friction disc to be urged against a friction member solid with the fan hub, and in the other position the drive is disconnected or the clutch disengaged.

Under these conditions, the fan drive is responsive to the value of the oil pressure controlling the axial displacement of the friction disc. This control action may be obtained automatically by using a conventional-type thermostat, or preferably by inserting in the oil circuit a thermostat of the type described hereinafter with reference to the attached drawing forming part of this invention and illustrating diagrammatically by way of example a practical form of embodiment of the invention wherein the fan-driving shaft is the water-pump driving shaft. In the drawings:

FIGURE 1 is a half-sectional view taken along the axis of the shaft driving the fan and the water pump, and FIGURE 2 is an axial section showing the arrangement of the thermostatic control valve.

Referring to the drawing, the fan 1 is mounted on the water-pump shaft 2 through the intermediary of a hub 4 having a friction face 4¹ and of a ball bearing 3.

The shaft 2 on which the driving pulley 5 is keyed rotates in a journal 6 force-fitted in the water-pump body 7 and provided at either end with fluid seals 8, 9.

The grooved pulley 5 carries a friction disc or ring 10 formed with spaced cylindrical projections 11 extending in a direction parallel to the axis of shaft 2, these projections being adapted to slide freely in blind holes formed in the pulley 5, as shown. The disc or ring 10 is secured in a fluid-tight manner (for example by gluing or vulcanisation) to a resilient diaphragm 12 acting somewhat as a spring as will be explained presently. This diaphragm 12 may consist of rubber, reinforced if desired with metal, and is clamped between an upset ring 13 and a distance piece 14 in order to preserve the fluid tightness of the cavity or chamber 15 formed between this diaphragm 12 and the registering face of the pulley 5.

The oil under pressure taken for example from the valve rocker shaft 16 is directed through a pipe 17 into the journal 6 for lubricating same.

The chamber 15 is pressure-balanced, for example by means of orifices 18, relative to the capacity surrounding the journal 6 the two ends of which communicate through passages such as 6a.

The oil may escape from this capacity through the pipe 19 and enter the thermostatic valve from which it is returned freely through another pipe 21 to the engine sump.

In the form of embodiment of the thermostatic valve which is given by way of example in FIG. 2, this valve consists of a body 20, a central portion 22, a bimetallic washer 23, a rigid washer 24, a ball-valve 25 adapted to close an orifice 26, an oil inlet 27 connected to the pipe 19 and an oil outlet 28 connected to the pipe 21.

The assembly thus described operates as follows:

When the cold engine is started the bimetallic washer 23 is in the position illustrated, and the oil can flow freely through the orifice 26 and return to the engine through the pipe 21. Under these conditions, the oil pressure built up in the chamber 15 is not sufficient to overcome the force of the antagonistic spring consisting of the flexible diaphragm 12. The friction disc 10 is kept away from the registering face 41 of the friction member 4 solid with the fan, so that the latter is not driven.

When the engine temperature attains the desired value, the bimetallic washer 23 is deflected; in other words, its curvature is reversed and thus the washer 24 is pushed upwards, thereby causing the ball 25 to close the orifice 26.

As the oil cannot return to the engine sump a pressure develops in the cavity 15 which is sufficient to urge the diaphragm 12 and the friction disc 10 so that the latter will engage the member 4 and start the fan by providing a driving connection between this fan and the water pump shaft.

According to the engine load and cooling conditions the engine temperature may either become stabilized or decrease slowly. However, as the change in the concavity of the bimetallic washer 23 takes place only with a temperature difference consistent with its shape and with the nature of its component materials, it is thus possible to introduce a delay effect in the fan drive control in order to avoid frequent successive alternate engagements and disengagement of this clutch drive.

Under these conditions it is possible to cause the fan clutch engagement to occur when the temperature of the cooling water attains 85° C., and the fan clutch disengagement when this temperature is below 65° C.

An additional advantage of the device according to this invention is the lubrication of the water pump by the circulation of engine oil, so that the driving shaft may be mounted on plain bearings instead of ball-bearings, the latter being a must when only a grease nipple is provided for its lubrication.

I claim:
1. For use with the cooling system of a vehicle engine which includes a driving shaft and a fan, a hydraulic clutch device for drivingly connecting and disconnecting the shaft and the fan and comprising a clutch operatively interposed between the fan and the shaft and including a movable clutch element carried by the shaft, means normally retaining the movable clutch element in a disengaged position, a journal for the shaft, means providing a lubrication chamber in which the journal is mounted, means providing an auxiliary chamber for the oil in which oil pressure can be established to act on the movable clutch element and move it into an engaged position, means continuously communicating the auxiliary chamber with the lubricating chamber, a source of oil under pressure for the engine, means continuously communicating the oil source with the lubricating chamber, a return conduit communicating the lubricating chamber with the oil source, and a thermostatically controlled valve mounted in said return conduit downstream of the clutch and responsive to the oil temperature to close off the return conduit and cause an operating pressure to be built up in the auxiliary chamber and thereby move the movable clutch element into an engaged position.

2. For use with the cooling system of a vehicle engine which includes a water pump shaft and a fan, a hydraulic clutch device for drivingly connecting and disconnecting the shaft and the fan and comprising a clutch element adapted to be carried by the fan, a movable clutch element, means carrying said movable clutch element and connecting it to said shaft, a resilient diaphragm connected to and acting on the movable clutch element to normally retain it out of engagement with the fan clutch element, a journal for the shaft, means providing a lubrication chamber in which the journal is mounted, a source of oil under pressure for the engine, a conduit connecting the oil source with the chamber to supply lubricating oil for the shaft journal, said movable clutch element carrying means and the diaphragm defining an auxiliary chamber, means continuously communicating the lubricating chamber with the auxiliary chamber, a return conduit connecting the lubricating chamber to the oil source, a valve mounted in the return conduit, and means in contact with the oil and responsive to the temperature thereof for closing said valve when a predetermined temperature is reached by the oil and thereby creating an operating pressure in the auxiliary chamber to act on the diaphragm and move the movable clutch element into engagement with the fan clutch element.

3. A device as claimed in claim 2, wherein said valve includes a valve body having an axial inlet passage, a ball valve adapted to close off said passage, said valve body having a closed end confronting the ball valve and having a lateral outlet communicating with a passage surrounding the inlet passage and in communication therewith at the end of the valve body, and said temperature responsive means including a washer backing up the ball valve and a bimetallic washer interposed between the washer and the end of the valve body and formed to respond by change of shape to the oil temperature and thereby cause the backing washer to seat the ball valve and close off the inlet passage in the valve body.

References Cited in the file of this patent

UNITED STATES PATENTS

| | | |
|---|---|---|
| 2,194,274 | Boyd | Mar. 19, 1940 |
| 2,213,147 | Parkins et al. | Aug. 27, 1940 |
| 2,722,296 | Stoeckicht | Nov. 1, 1955 |
| 2,840,316 | Herbenar | June 24, 1958 |
| 2,890,687 | Richmond | June 16, 1959 |

FOREIGN PATENTS

| | | |
|---|---|---|
| 330,412 | Germany | Sept. 9, 1919 |